United States Patent [19]

Barbic

[11] 4,314,831

[45] Feb. 9, 1982

[54] AIR FILTER ASSEMBLY IN COMBINATION WITH MOTOR VEHICLE GENERATOR

[76] Inventor: Mato Barbic, #613-2012 Fullerton Ave., North Vancouver, British Columbia, Canada, V7P 2E3

[21] Appl. No.: 157,475

[22] Filed: Jun. 9, 1980

[51] Int. Cl.³ .................... B01D 46/52; H02K 9/26
[52] U.S. Cl. ................... 55/385 R; 55/419; 55/498; 55/502; 55/503; 55/505; 310/56
[58] Field of Search .......... 55/385 R, 419, 498, 55/502, 503, 505, 385 D; 310/56

[56] References Cited

U.S. PATENT DOCUMENTS

| | | | |
|---|---|---|---|
| 1,972,315 | 9/1934 | Ramey | 55/385 R |
| 1,988,430 | 1/1935 | Koch | 310/56 |
| 2,057,196 | 10/1936 | Koch | 310/56 |
| 2,699,928 | 1/1955 | Mayer et al. | 55/503 |
| 2,979,159 | 4/1961 | Pritchard et al. | 55/498 |
| 3,085,383 | 4/1963 | Carbig | 55/505 |
| 3,546,853 | 12/1970 | Claar | 55/419 |
| 3,803,817 | 4/1974 | Lewis | 55/498 |
| 3,840,762 | 10/1974 | Kasabian | 310/56 |

FOREIGN PATENT DOCUMENTS

| | | | |
|---|---|---|---|
| 13065 | 10/1955 | Fed. Rep. of Germany | 55/498 |
| 2013113 | 9/1971 | Fed. Rep. of Germany | 310/56 |
| 630072 | 12/1961 | Italy | 55/498 |

*Primary Examiner*—David L. Lacey
*Attorney, Agent, or Firm*—Richard H. Zaitlen

[57] ABSTRACT

An air filter assembly for a heavy duty motor vehicle generator is disclosed. The assembly includes an adaptor plate and connecting means for rigidly connecting the adaptor plate to one end of the generator. The assembly further includes a housing enclosing a chamber and an air filter element removably disposed in the chamber, the housing having a circular threaded collar threadably engaged to the adaptor plate. Through the air filter element, and apertures provided in the housing and adaptor plate cooling air flow is permitted to flow but particulate foreign matter is excluded.

16 Claims, 4 Drawing Figures

AIR FILTER ASSEMBLY IN COMBINATION WITH MOTOR VEHICLE GENERATOR

BACKGROUND OF THE INVENTION

1. Field of the Invention

This invention relates to air filters and, more particularly, to an air filter assembly for a heavy duty motor vehicle generator. The air filter assembly is intended to have particular application to a heavy duty motor vehicle generator which is operating in a dust-laden environment.

2. Description of the Prior Art

Motor vehicle generators (the term "generator" as used herein includes alternators) and, particularly, heavy duty motor vehicle generators typically include air flow passages which permit cooling air to flow through the generator. A fan coupled to a belt-driven pulley is conventionally provided at one end of the generator to draw cooling air therethrough. The end of the generator opposite the fan usually includes rectifier means and one or more heat sinks for dissipating heat build-up in the rectifiers. An apertured plate (which may include the aforementioned heat sinks) is commonly provided to "cap" the rectifier end of the generator. In operation, the fan draws cooling air through the apertured plate, over the heat sinks and through the air flow passages within the generator assembly to exit past the fan.

It has been found that heavy duty motor vehicle generators which operate in dust-laden environments are subject to frequent breakdown which necessitates removal of the generator from the vehicle for disassembly, cleaning and/or repair and replacement in the vehicle. It is believed that such breakdowns are caused at least in part by particulate foreign matter such as dust which is drawn into the generator together with the cooling air.

For maximum cost-efficiency, heavy duty motor vehicles are often operated on a round-the-clock basis. Where the vehicles are operated in dust-laden environments, it has been found necessary to maintain a substantial inventory of replacement generators to minimize vehicle "down time" while a non-functional generator is removed and replaced with a functional generator from the inventory. Maintenance of an inventory of replacement generators implies increased costs for purchasing the replacement generators, for storing the inventory, for removing a non-functional generator from a vehicle (which entails severing of both mechanical and electrical connections between the generator and the vehicle), for mounting a replacement generator in the vehicle, and for "tearing down", cleaning and/or repairing and re-assembling the non-functional generator so that it may be returned to the inventory of replacement generators. Notwithstanding such cost, the problem of frequent breakdown has been long-standing. Manufacturers and suppliers of heavy duty motor vehicle generators have not provided a solution to the problem, although requested to do so.

The foregoing problems have been found to be particularly accentuated where heavy duty motor vehicles such as bulldozers, scrapers, trucks, loaders and the like are used in environments laden with coal-dust (e.g. open pit coal mines).

The present invention provides an air filter assembly for removing particulate foreign matter such as dust from the cooling air which is allowed to pass through a heavy duty motor vehicle generator and has been found to substantially prolong the period for which such a generator may remain in service while operating in a dust-laden environment. This implies a resultant saving in the cost of maintaining an inventory of replacement generators (since break-downs are less frequent, fewer replacement generators are required to keep a "fleet" of vehicles in operation), also implies a saving in the cost of labor required to remove, disassemble, clean and/or repair and replace non-functional generators. Vehicle "down time" is also reduced because a vehicle need not be taken out of service to interchange generators as frequently. The present invention contemplates simple maintenance at regular intervals to change the air filter element provided for use with the air filter assembly. This may be accomplished by an unskilled person since it is not necessary to tamper with any electrical connections or remove the generator from the vehicle to replace the air filter element.

SUMMARY OF THE INVENTION

The present invention is directed to an air filter assembly for a heavy duty motor vehicle generator. The assembly comprises an adaptor plate and connecting means for rigidly connecting the adaptor plate to one end of the generator, the adaptor plate including an aperture for permitting air flow communication between the assembly and the generator. The assembly also comprises an air filter element. The assembly further comprises a housing enclosing a chamber, the housing including an air outlet aperture communicating between the chamber and the adaptor plate aperture, a plurality of air inlet apertures communicating between the chamber and the atmosphere surrounding the housing, and, a circular threaded collar threadably engaged to the adaptor plate. The air filter element is disposed within the chamber between the air outlet aperture and the plurality of air inlet apertures and is selected to permit cooling air flow to the generator, while excluding particulate foreign matter from the cooling air flow.

In one preferred embodiment, the connecting means comprises a sleeve snugly receivable around the periphery of one end of the generator, the adaptor plate being circumferentially affixed to an end of the sleeve.

In another preferred embodiment the connecting means comprises at least one bolt threadably receivable by the generator.

Advantageously, gasket means are provided for sealing engagement around the collar between the adaptor plate and the housing.

Preferably, means are affixed to the housing for assisting in the tightening of the housing against the adaptor plate.

The present invention is considered to be especially advantageous for heavy duty motor vehicle generators operating in coal-dust laden environments. An annular, pleated paper element may be used as the air filter element. With a filter pore size in the range of about 0.4 to 0.6 millimeters and a gauge thickness in the range of about 0.0016 to about 0.0021 inches good filtering characteristics which do not unduly inhibit the flow of cooling air can be achieved for this environment.

DESCRIPTION OF THE PREFERRED EMBODIMENTS

Figure 1:
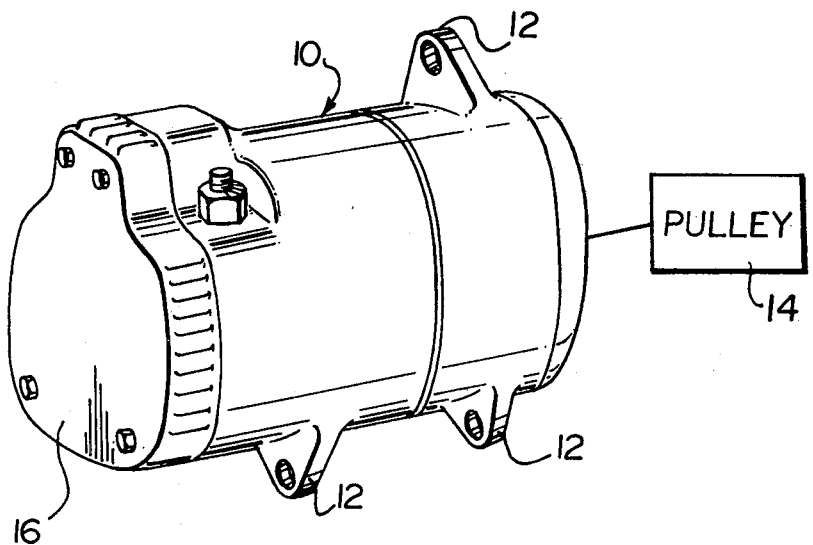
FIG. 1 is a pictorial representation of a typical generator.

FIG. 1 depicts a typical generator, generally designated 10, of the type used in heavy duty motor vehicles, especially trucks and other equipment such as are found at open-pit coal mines. Apertured bosses 12 are provided on the generator housing for affixation of the generator to the engine of a motor vehicle. A pulley 14 is provided at one end of generator 10 to receive a belt (not shown) for driving the generator. A fan (not shown) is usually coupled to pulley 14. When the generator is driven, the fan rotates to draw cooling air through the generator. An apertured cover plate 16 is disposed on the end of the generator opposite pulley 14. Cover plate 16 typically includes heat sink means for dissipating heat build up in the generator rectifiers. Cover plate 16 may also include one or more bolts for affixation thereof on the end of generator 10.

The present invention is of general application in that it may easily be adapted for use with most heavy duty motor vehicle generators of the type shown generally in FIG. 1 with minimal modification to the generators. To facilitate use of the air filter assembly with a wide range of generators, it has been found convenient to provide an adaptor plate and coupling means for rigidly coupling the adaptor plate to one end of generator 10. Mounting means are affixed to the adaptor plate for threadably engaging a circular threaded collar provided on the air filter assembly.

To further the understanding of the invention by those skilled in the art, two preferred embodiments are described to illustrate how an adaptor plate and coupling means may be provided for two types of generator commonly encountered in the industry. The first preferred embodiment (generally designated 40 in FIGS. 2 and 3) illustrates use of the air filter assembly with a Delco Remy 25 S1 series/type 400/450 integral charging system generator. The second preferred embodiment generally designated 41 in FIG. 4) illustrates a means for connecting the air filter assembly to an ELECTRODYNE ® brushless alternator, models E80, E95, E95SC, E95-24 or E95-32.

The first preferred embodiment of the invention (shown in FIGS. 2 and 3) includes an adaptor plate 20 through which one or more bolts (not shown) may be passed, the bolts being threadably receivable by the generator. In this preferred embodiment, generator cover plate 16 is removed and adaptor plate 20 machined to fit on the end of the generator in place of cover plate 16. Holes are drilled in adaptor plate 20 in alignment with holes provided in generator 10 for receiving the bolts which formerly held cover plate 16 on the end of generator 10. Adaptor plate 20 is bolted on the end of generator 10 in place of cover plate 16. Aperture 22 is provided in adaptor plate 20 to permit air flow communication between the air filter assembly and air flow passages within generator 10. A threaded collar 24 is rigidly affixed to adaptor plate 20 around aperture 22. Collar 24 serves as a mounting means for threadably engaging a mating collar provided on the air filter assembly for affixation thereof to the adaptor plate.

Figure 4:
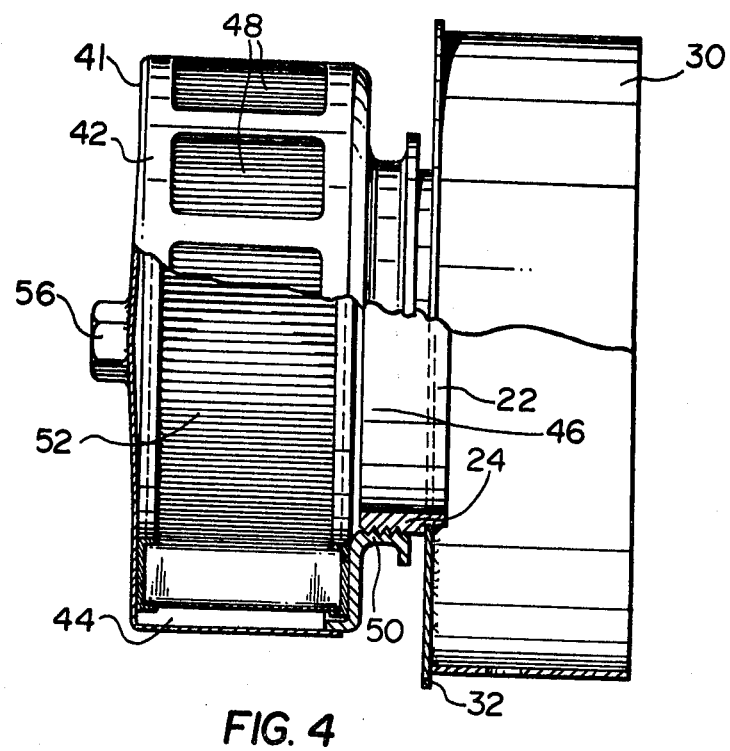
FIG. 4 is a side elevation view, partially cut-away and partially in cross-section, of another preferred embodiment of an air filter assembly in accordance with the present invention.

In some cases it may be difficult or impractical to machine an adaptor plate for affixation to generator 10 as contemplated by the first preferred embodiment described above. For example, electrical fittings protruding from the end of generator 10 may prevent the desired firm engagement of adaptor plate 20 against the end of the generator. If holes are provided in adaptor plate 20 to accommodate protrusions on the generator, then unfiltered air containing dust or other particulate foreign matter may be drawn into the generator, defeating the purpose of the invention. Alternatively, the generator may not have a cover plate which is removable. In such cases, the preferred embodiment depicted in FIG. 4 may be used. As shown in FIG. 4, a sleeve 30 which is snugly receivable around the periphery of the end of generator 10 opposite pulley 14 is provided. Sleeve 30 should be made long enough to extend from the end of generator 10 beyond any protrusions therefrom. An adaptor plate 32 is then welded around one side of its circumference to the protruding end of sleeve 30. Sleeve 30 may be spot-welded to the generator housing at several points to prevent it becoming dislodged during operation of the vehicle. If necessary, holes may be drilled through sleeve 30 and fitted with grommets through which electrical connections to generator 10 may pass. Adaptor plate 32 is analogous to adaptor plate 20 except, of course, it will not be necessary to drill holes through adaptor plate 32 for affixation thereof to the generator by means of bolts—this being accomplished by the snug fitting sleeve 30 and spot-welding thereof to the generator. Adaptor plate 32 does however provide an adaptor plate aperture 22 and a collar 24 identical to those provided on adaptor plate 20. Collar 24 is affixed to a second side of adaptor plate 32 which is opposite the side welded to sleeve 30.

Figure 2:
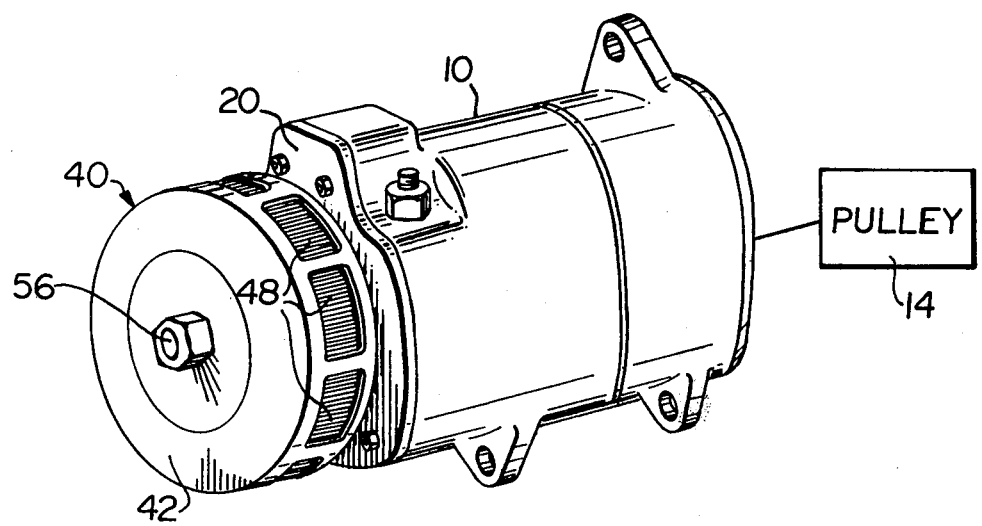
FIG. 2 is a pictorial representation of a typical generator including one preferred embodiment of an air filter assembly in accordance with the present invention.
Figure 3:
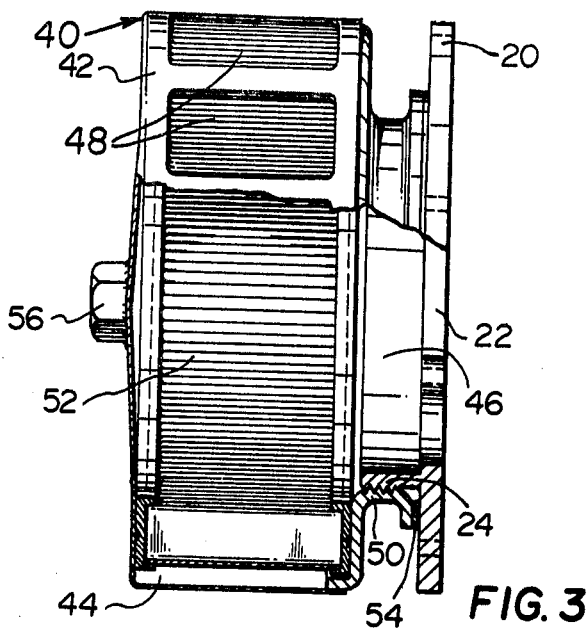
FIG. 3 is a side elevation view, partially cut-away and partially in cross-section, of the air filter assembly shown in FIG. 2.

Air filter assembly 40 shown in FIGS. 2 and 3, and air filter assembly 41 shown in FIG. 4, each include a housing 42, the structure of the housing being essentially the same in each case. In each case, housing 42 encloses a chamber 44 and includes an air outlet aperture 46 for communicating between chamber 44 and adaptor plate aperture 22. A plurality of air inlet apertures 48 are disposed around the periphery of housing 42 to communicate between chamber 44 and the atmosphere which surrounds housing 42. Housing 42 also includes a circular threaded collar 50 for threadably engaging collar 24 of adaptor plate 20 or 32 (as the case may be).

A replaceable air filter element 52 is disposed within chamber 44 to filter air which passes through apertures 48 to aperture 46. Air filter element 52 is selected to permit cooling air to flow to the generator and thus prevent overheating thereof, while excluding from the cooling air flow foreign particulate matter such as dust which might interfere with operation of the generator.

Housing 42 may conveniently be made cylindrical in shape and air filter element 52 may advantageously be an annular, pleated, paper element. As noted in the introduction, an annular, pleated paper element having a filter pore size in the range of about 0.4 to 0.6 millimeters and a gauge thickness in the range of about 0.0016 to 0.0021 inches should provide good filtering characteristics in environments such as coal-dust laden environments. A neoprene gasket 54 is provided between adaptor plate 22 (or 32, as the case may be) and collar 50 for sealing engagement therebetween to prevent unfiltered air being drawn into the generator.

Advantageously, a hexagonal nut 56 is welded to housing 42 to receive a wrench for tightening housing 42 against adaptor plate 20 or 32.

In operation, the generator fan (not shown) draws air from the atmosphere surrounding housing 42 through apertures 48 and through air filter element 52 which excludes dust and other particulate foreign matter from the air permitted to pass therethrough. After passing through air filter element 52, the air is drawn from chamber 44, through housing aperture 46 and adaptor plate aperture 22 and thence into air flow passages within generator 10 for cooling of the generator.

As air filter element 52 becomes clogged with dust or other particulate foreign matter it should be replaced with a fresh air filter element to prevent disruption of the flow of cooling air to generator 10. To interchange air filter elements, housing 42 is removed from collar 24, the old air filter element withdrawn from housing 42 and replaced by a new air filter element. Housing 42 is then screwed back on collar 24. The interchanging operation may quickly be accomplished by an unskilled person with minimal labor and handling of parts.

I claim:

1. An air filter assembly in combination with and joined to a motor vehicle generator, said air filter assembly comprising:
   (a) an adaptor plate and connecting means rigidly connecting said adaptor plate to one end of said generator, said adaptor plate including an aperture positioned and arranged to provide air flow communication between the assembly and said generator;
   (b) an air filter element; and,
   (c) a housing enclosing a chamber, said housing including:
      (i) an air outlet aperture communicating between said chamber and said adaptor plate aperture;
      (ii) a plurality of air inlet apertures communicating between said chamber and the atmosphere surrounding said housing; and,
      (iii) a circular threaded collar threadably engaged to said adaptor plate;
   said air filter element being removably disposed in said chamber between said air outlet aperture and said plurality of air inlet apertures for directing cooling air flow to said generator, while excluding particulate foreign matter from said cooling air flow.

2. The combination as defined in claim 1, wherein said connecting means comprises a sleeve snugly positioned around the periphery of one end of the generator, said adaptor plate being circumferentially affixed to an end of said sleeve.

3. The combination as defined in claim 2, further comprising gasket means for sealing engagement around said collar between said adaptor plate and said housing.

4. The combination as defined in claim 3, further comprising means affixed to said housing for assisting in the tightening of said housing against said adaptor plate.

5. The combination as defined in claim 4, wherein said air filter element is an annular, pleated, paper element.

6. The combination as defined in claim 1, wherein said connecting means comprises at least one bolt threadably received by the generator.

7. The combination as defined in claim 6, further comprising gasket means for sealing engagement around said collar between said adaptor plate and said housing.

8. The combination as defined in claim 7, further comprising means affixed to said housing for assisting in the tightening of said housing against said adaptor plate.

9. The combination as defined in claim 8, wherein said air filter element is an annular, pleated, paper element.

10. An air filter assembly in combination with and joined to a motor vehicle generator, said air filter assembly comprising:
    (a) an adaptor, including:
       (i) a sleeve joined to one end of said generator;
       (ii) an adaptor plate having a first side, a second side, and an aperture positioned and arranged to provide air flow communication between the assembly and said generator, said first side being circumferentially affixed to an end of said sleeve; and,
       (iii) a first threaded collar affixed to said second side of said plate around said aperture;
    (b) an air filter element; and,
    (c) a housing enclosing a chamber, said housing including:
       (i) an air outlet aperture communicating between said chamber and said adaptor plate aperture;
       (ii) a plurality of air inlet apertures communicating between said chamber and the atmosphere surrounding said housing; and
       (iii) a second threaded collar affixed around said air outlet aperture and threadably engaged to said first collar;
    said air filter element being disposed in said chamber between said air outlet aperture and said plurality of air inlet apertures for directing cooling air flow to said generator, while excluding dust from said cooling air flow.

11. An air filter assembly in combination with and joined to a motor vehicle generator, said air filter assembly comprising:
    (a) an adaptor, including,
       (i) an adaptor plate having an aperture positioned and arranged to provide air flow communication between the assembly and said generator,
       (ii) at least one bolt joined to said generator for rigidly affixing said adaptor plate to one end of said generator;
       (iii) a first threaded collar affixed to said plate around said aperture;
    (b) an air filter element; and,
    (c) a housing enclosing a chamber, said housing including:
       (i) an air outlet aperture communicating between said chamber and said adaptor plate aperture,
       (ii) a plurality of air inlet apertures communicating between said chamber and the atmosphere surrounding said housing; and,
       (iii) a second threaded collar fixed around said air outlet aperture and threadably engaged to said first collar;
    said air filter element being disposed in said chamber between said air outlet aperture and said plurality of air inlet apertures for directing cooling air flow to said generator, while excluding dust from said cooling air flow.

12. The combination as defined in claim 10 or 11, further comprising gasket means for sealing engagement around said collars between said plate and said housing.

13. The combination as defined in claim 10 or 11, further comprising means affixed to said housing for assisting in the tightening of said housing against said plate.

14. The combination as defined in claim 10 or 11, wherein said air filter element is an annular, pleated, paper element.

15. The combination as defined in claim 10 or 11, wherein said filter element has a selected pore size in the range of about 0.4 to 0.6 millimeters.

16. The combination as defined in claim 10 or 11, wherein said filter element is an annular, pleated, paper element having a selected pore size in the range of about 0.4 to 0.6 millimeters and a selected guage thickness in the range of about 0.0016 to about 0.0021 inches.

* * * * *